Feb. 8, 1966
C. CHILOWSKY
3,233,548
DIRIGIBLE AERIAL TORPEDO
Filed Nov. 12, 1963
4 Sheets-Sheet 1
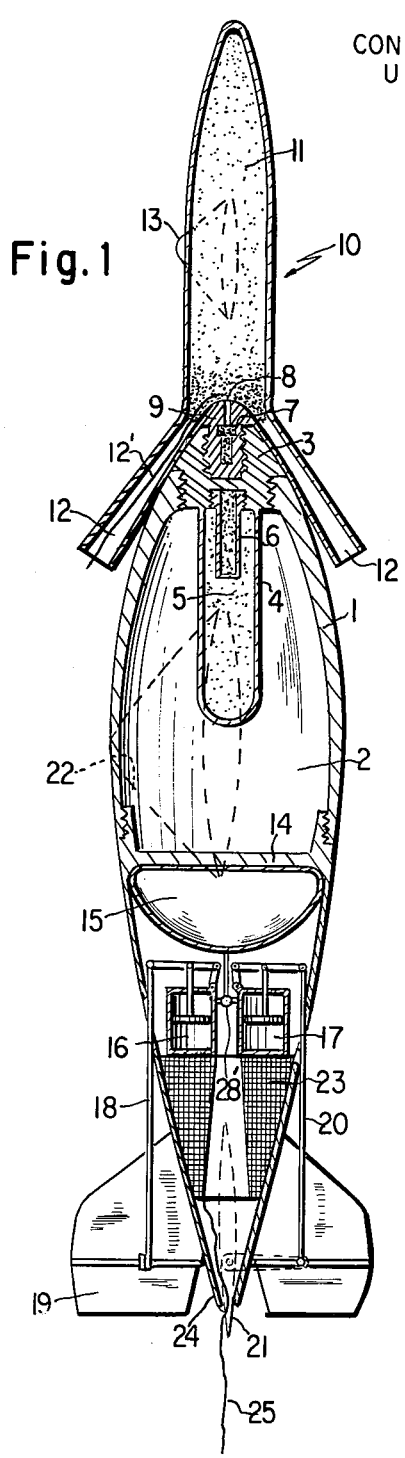
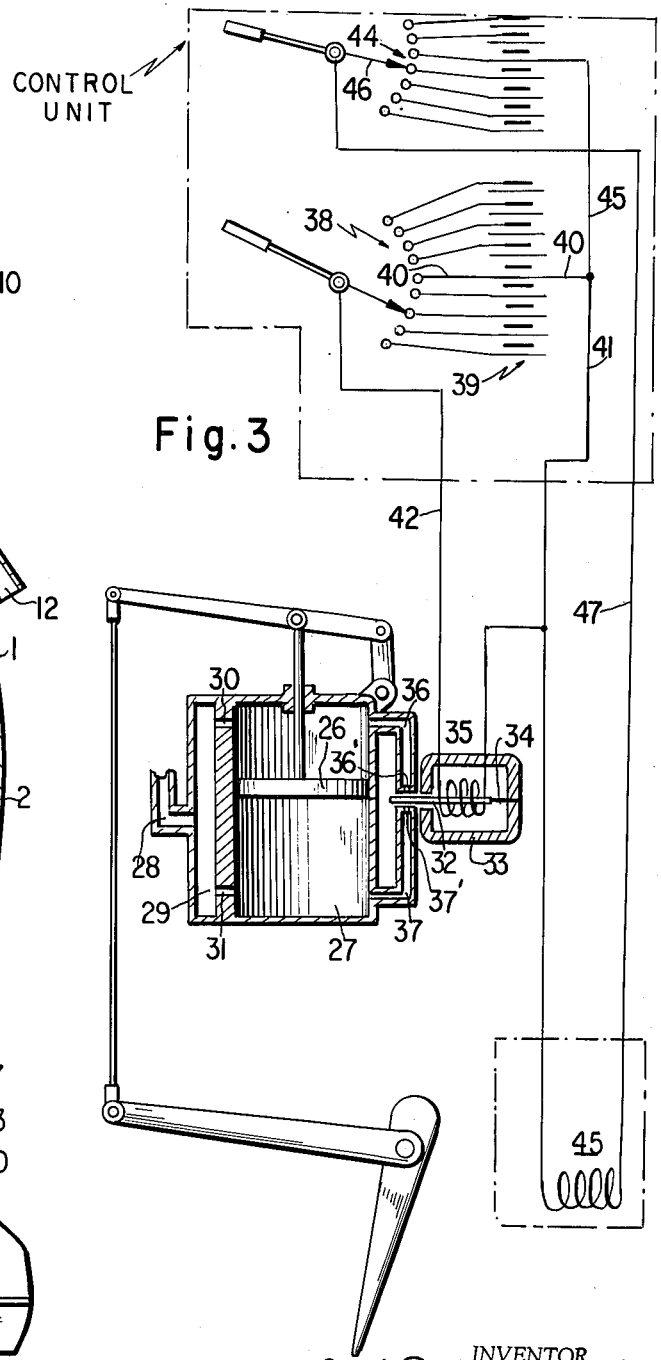
INVENTOR.
Constantin Chilowsky, deceased,
by W. Garton Seward, Executor
BY
Brown & Seward
ATTORNEYS Feb. 8, 1966     C. CHILOWSKY     3,233,548
DIRIGIBLE AERIAL TORPEDO
Filed Nov. 12, 1963     4 Sheets-Sheet 2
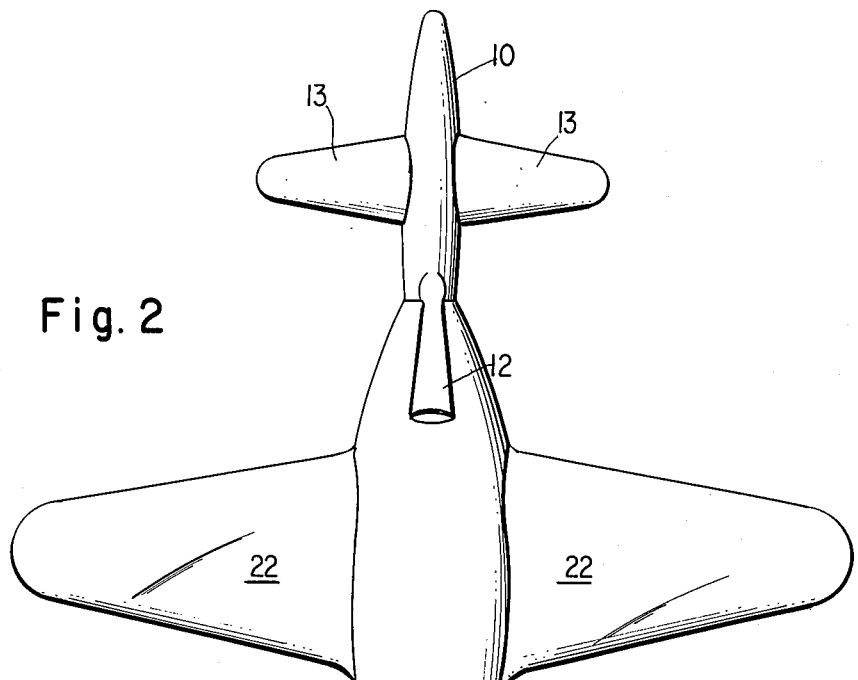
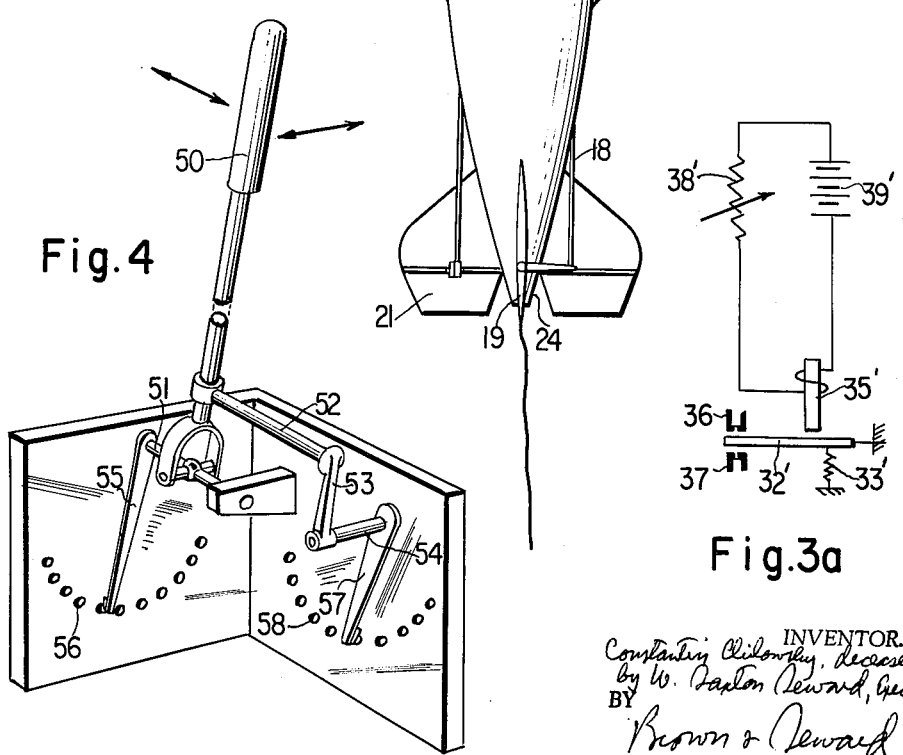

Feb. 8, 1966  C. CHILOWSKY  3,233,548
DIRIGIBLE AERIAL TORPEDO
Filed Nov. 12, 1963  4 Sheets-Sheet 3
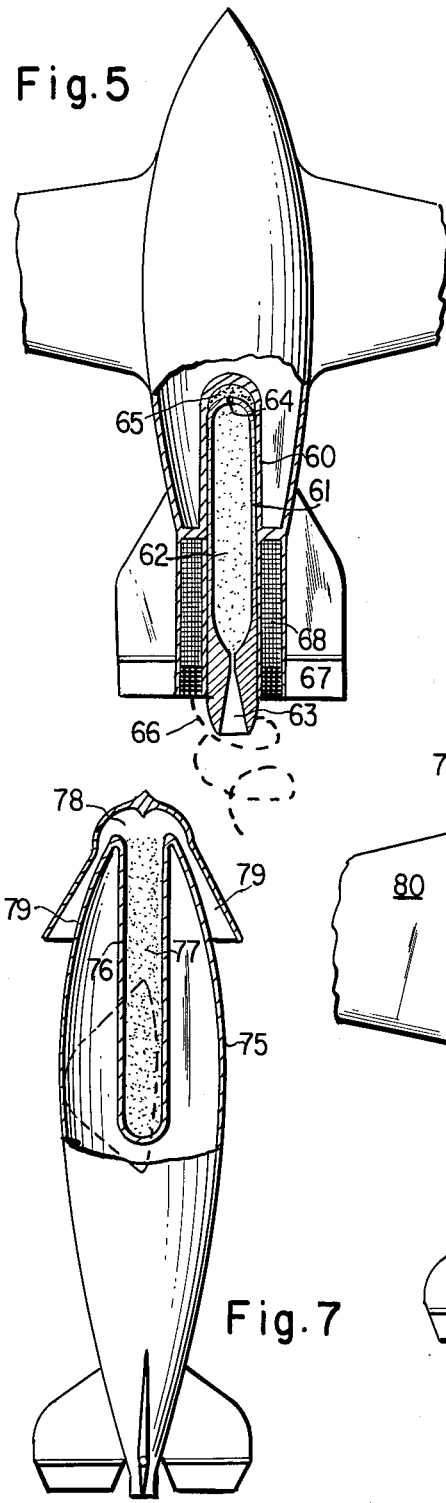
Fig. 5
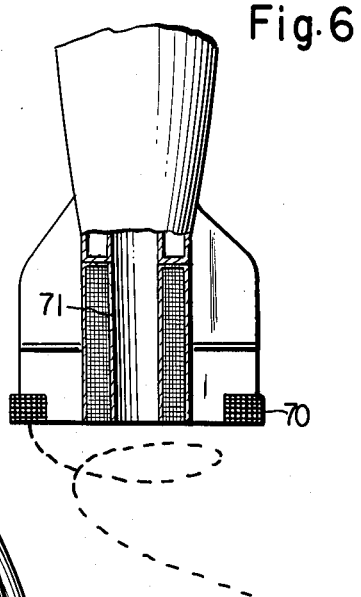
Fig. 6
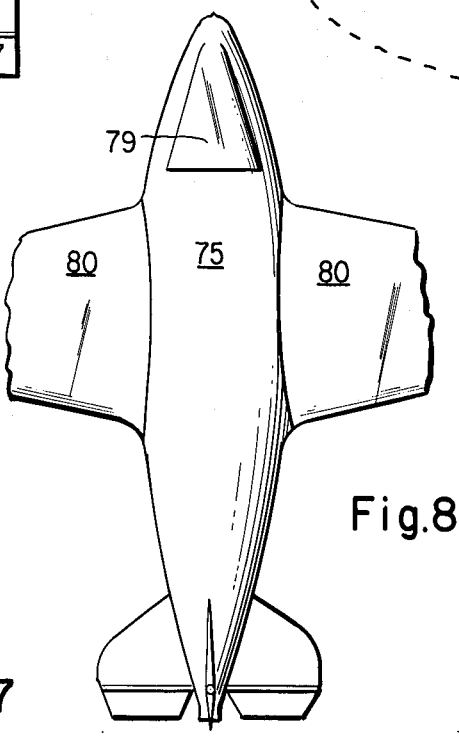
Fig. 7
Fig. 8
INVENTOR.
Constantin Chilowsky, deceased,
BY by W. Paxton Seward, Executor
Brown & Seward
ATTORNEYS Feb. 8, 1966     C. CHILOWSKY     3,233,548
DIRIGIBLE AERIAL TORPEDO
Filed Nov. 12, 1963     4 Sheets-Sheet 4

INVENTOR.
Constantin Chilowsky, deceased,
BY W. Saxton Seward
Brown & Seward   Executor
ATTORNEYS

# United States Patent Office 3,233,548
Patented Feb. 8, 1966

3,233,548
DIRIGIBLE AERIAL TORPEDO
Constantin Chilowsky, deceased, late of New York, N.Y., by W. Saxton Seward, executor, Morris Township, N.J., assignor to Conrad Precision Industries, Inc., New York, N.Y., a corporation of Delaware
Filed Nov. 12, 1963, Ser. No. 323,162
8 Claims. (Cl. 102—49)

This invention relates to a dirigible aerial torpedo and method of operating same, referring particularly to such a torpedo which is adapted to be launched from the ground and guided throughout its flight to a stationary or moving target such as a tank.

It is an object of the invention to provide such a torpedo which, with its controls, can be carried by one or two men and which can be set up and operated very quickly at any desired location.

It is another objective of the invention to provide such a torpedo which can be launched from a concealed or camouflaged location and which can also be controlled throughout its flight with a minimum of exposure of the operator or operators.

It is a further object of the invention to provide certain improvements in the form, construction and arrangement of the several parts whereby the foregoing and other objects may effectively be attained.

The torpedo shown and described herein is preferably formed as a glider designed to be very stable in the air and equipped with simple directional and depth rudders, controlled from the ground by means of appropriate remote control devices operated preferably throughout the entire flight of the torpedo. The torpedo is designed to weigh approximately from 15 to 25 kg., to occupy only a small space and to be conveniently portable by one man.

For launching, the torpedo may be placed on the ground, merely propped up to a suitable angle by any available means such as a stone or stick. Its flight is initiated merely by firing of a rocket either detachably connected to the torpedo or incorporated into it. Since the torpedo is intended to be capable of gliding throughout at least a substantial part of its trajectory, the rocket may only provide initial propulsion for a very short period in order to bring the torpedo up to a maximum velocity of 80 to 100 meters per second, after which the torpedo continues its flight to the target by expending part of the live force thus acquired.

The rocket, whether built in or detachable, may desirably be associated with the front part of the torpedo, the propulsive gases being so directed that they will not damage the wings. The rear part of the torpedo houses a simple guidance mechanism and a coil of very fine two or three strand wire cable which connects the torpedo with its ground control post and is fed out freely during the torpedo's flight. Gases from a rocket on the front of the torpedo obviously cannot damage the control wire at the rear, but it is possible to provide a special form of wire which might be used in case the rocket is installed in the rear, as shown in certain modified forms to be described below.

It is proposed to operate the rudders by means of pneumatic pistons the valves of which are controlled by solenoids energized by currents from simple storage batteries at the ground control post under the control of manually actuated rheostats.

Practical embodiments of the invention are shown in the accompanying drawings in which:

FIG. 1 represents a vertical section of a torpedo equipped with a rocket on its front end, the assembly being shown in vertical position for convenience of illustration;

FIG. 2 represents a top plan view on a somewhat smaller scale of the torpedo and rocket shown in FIG. 1;

FIG. 3 represents somewhat diagrammatically the remote control system, including one of the pneumatic cylinders;

FIG. 3a represents diagrammatically a detail modification of the valve control;

FIG. 4 represents a perspective view of a control device operated by a single handle;

FIG. 5 represents a top plan view, parts being cut away and shown in section, of a modified form having a rocket mounted in the rear of the torpedo;

FIG. 6 represents a detail top plan view, parts being broken away and in section, showing another modified form of the rear mounting for the rocket;

FIG. 7 represents, partly in side elevation and partly in vertical section, another modified form in which the rocket is built into the front part of the torpedo;

FIG. 8 represents a top plan view of the torpedo shown in FIG. 7, parts of the wings being broken away;

Figure 9:
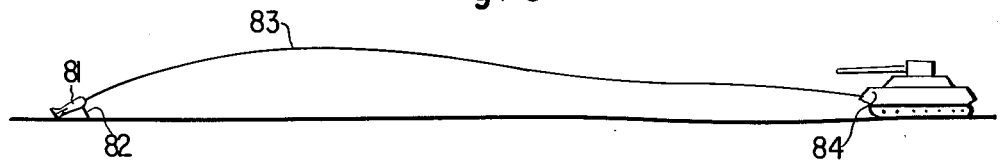
FIG. 9 represents diagrammatically the trajectory of a torpedo aimed against a tank and guided by direct sighting.

Referring to the drawings, and particularly FIGS. 1 and 2, the outer shell 1 of the torpedo is formed with a chamber 2 adapted to contain a suitable explosive charge (not shown) and having its forward end closed by a threaded nose piece 3, on the rear of which is mounted a smaller enclosure 4 containing a detonating charge 5 and a percussion cap 6. The nose piece is also provided with a small axially disposed chamber 7 containing a second detonating charge, the chamber 7 being in communication with the interior of the rocket by means of a small passage 8 which may be filled with a slow burning powder. The chamber 7 and passage 8 are shown as being formed in a threaded plug 9 constituting part of the rocket 10, the forward part of the rocket being filled with rocket fuel 11 of any suitable character and the rear part of the rocket being provided with upper and lower nozzles 12, 12 which are directed rearwardly above and below the forward end of the torpedo. The rocket may also be provided with small wings 13, 13, as shown in FIG. 2, such wings being detachable, as desired, for convenience in transportation or storage.

The torpedo is shown as being divided by a partition 14 which separates the chamber 2 from a rear compartment in which is located a compressed air tank 15, the pneumatic servo-motors 16, 17, and the solenoids and valves for operating them, which are shown in detail in FIG. 3. The servo-motor 16 is connected to a longitudinally movable rod 18 for actuating in a simple and obvious manner the directional rudder 19 while the servo-motor 17 is similarly connected by a rod 20 to operate the depth rudder 21. Rudder segments on opposite sides of the rear of the torpedo may be suitably coupled for simultaneous movement, as by a simple yoke, not shown. The torpedo is provided with a pair of short wings 22, 22, preferably set with sufficient dihedral angle to ensure lateral stability in flight.

The rear compartment of the torpedo contains also a spool 23 of fine electric cable so arranged that it can unwind easily from the inside surface of the spool, passing out of the torpedo through a small opening in the rear of the conical rear end 24, the cable itself being indicated at 25.

Referring to FIG. 3, showing the details of one of the servo-motors 16, 17, the piston 26 in the cylinder 27 is moved up or down by the difference in compressed air pressure on its upper and lower surface. Compressed air is supplied from the tank 15 through a tube 28 to the distributing chamber 29 which is in communication with the upper and lower parts of the cylinder by means of inlet passages 30, 31. The escape of compressed air from each side of the piston is controlled by the position of a valve plate 32, made of magnetic material and placed between the poles of a permanent magnet 33. The plate 32 is supported at its rear end by a flexible strip 34 and is surrounded by a coil 35 adapted to vary the magnetic condition of the plate in such a manner as to permit it to be drawn toward the north or south poles of the magnet 33, as desired. Air may leave the cylinder 27 through either or both of the exhaust tubes 36, 37, the facing ends of which are provided with calibrated orifices 36', 37' respectively, adapted to be closed by the plate 32 in its upper or lower position, respectively. The closing or restricting of either such orifice will immediately cause an increase of air pressure on the side of the piston to which the closure or restriction relates, so that the piston will move up or down in the cylinder and actuate the corresponding rudder accordingly.

The direction and intensity of the current through the coil 35 is regulated by a potentiometer 38, shown as a series of contacts connected with the plates of a series of battery cells 39. A central wire 40 runs to a point of zero potential at the midway point of the battery assembly, which point is connected by a lead 41 to the coil 35, the circuit through the coil being completed by a lead 42 running to the contact arm 43 of the potentiometer. FIG. 3 shows also a second potentiometer 44 connected to a coil 45 corresponding to the second servo-motor for actuation of the other pair of rudders, the zero point of the potentiometer 44 being connected by a wire 45 to the lead 41 (which is thus part of each potentiometer-to-coil circuit) and the contact arm 46 of the potentiometer 44 being connected to the coil 45 by the wire 47.

In FIG. 3a is shown a modification in which a valve plate 32' has a part 32" within a coil 35', the current through which is supplied by a battery 39' and regulated by the adjustment of the variable resistance 38'. The plate is biased in one direction (toward tube 37) by a spring 33' and is moved in the opposite direction (toward tube 36) as the coil 35' is energized.

The potentiometers 38 and 44 (or variable resistances), with their associated batteries, may be located together at a single point for operation by one person or may be separated by a suitable distance and operated by two people. Together they constitute a control unit for guiding a torpedo in its flight. The wires 41, 42 and 47 can be very fine copper wires, insulated, of any length, and combined in a steel covering to constitute the cable 25, continuously connecting the control unit with the rudder actuating mechanism in the torpedo.

The potentiometers may be combined for operation by a single handle as illustrated in FIG. 4, the handle 50 being connected to a shaft 51 by a simple universal connection so that the handle can rotate said shaft around its axis and can also rotate in the plane of said shaft. The handle is conected by a link 52 to a crank 53 on a second shaft 54, lying in a plane perpendicular to the plane of the shaft 51. A contact arm 55 is mounted on the shaft 51 so as to be movable over the line of contacts 56 corresponding to one of the potentiometers 38 or 44 described above, and a contact arm 57 is mounted on the shaft 54 and designed to move over the line of contact points 58 corresponding to those of the other potentiometer. Such mounting of the handle 50, permits it to be used to adjust the two potentiometers simultaneously or separately, as may be required.

In the modified torpedo structure shown in FIG. 5, the rear of the torpedo is somewhat enlarged to provide a tubular cylinder 60, closed at its inner end and opening rearwardly. Within this cylinder is placed a rocket 61 charged with a suitable propellant 62, the combustion products of which leave through the rearwardly directed nozzle 63. At the forward end of the rocket there is a small hole 64 communicating with a space 65 which is left between the closed front end of the tube 64 and the front end of the rocket, this space being filled with a small explosive charge for ejecting the rocket from the torpedo when the propellent charge has been exhausted.

In the form of torpedo just described, the cable 66 is packed in a cylindrical form so that it can unwind from the rear of said cylinder. The portion of the cable which is fed out first may be provided with a considerably thicker protective covering of metal or heat resistant material intended to guard the cable against damage by the hot gases used for propulsion. This specially insulated portion is indicated at 67, while the reminder of the cable, of normal thickness, is indicated at 68. It is intended that the combustion of the propulsive charge will take place and be completed during the first part of the torepdo's flight, after which the rocket is ejected so that extra shielding of the cable to be fed out during the remainder of the flight is not needed. It will be understood that rudder controls of the character previously described are intended to be embodied in this form of torpedo, the compressed air tank, servo-motors and connections being located in the rear portion of the torpedo as before while a detonating charge is in the forward portion.

FIG. 6 shows a modification of the torpedo shown in FIG. 5, the thicker part of the cable being located as an annulus 70 fitted on the outer rear corners of the rudders while the normal cable 71 occupies a cylindrical space in the same location as the normal cable 68 of FIG. 5. In this modified form, the annulus 70 will render the rudders inoperative during the first part of the flight, when control is not always essential, but as soon as the shielded cable has been used up the rudders will be free to serve their desired purpose. Referring to FIGS. 5 and 6, it is intended that the ejection of the rocket by the charge (shown in the space 65 of FIG. 5) should be at such a low velocity that the rocket is not likely to damage the adjacent cable. Such ejection is also timed to take place before the shielded portion of the cable has been used up.

FIGS. 7 and 8 show another modified form of torpedo, resembling that shown in FIGS. 1 and 2 but having a non-detachable rocket incorporated into the front part of the torpedo's shell. In FIG. 7 the forward part of the shell 75 is broken away in order to show the provision of a tubular container 76 containing rocket fuel 77. This fuel is designed to be ignited at its forward end so that the products of combustion will pass first into the nose chamber 78 and then be directed rearwardly through the upper and lower nozzles 79, 79, the cross sectional areas of which enlarge progressively from front to back. In order to conserve energy and develop high velocity in the combustion products, the upper end of the tubular container 76 and the nose chamber 78 have substantially greater cross-sections than do the nozzles at their forward ends. The jets projected from the nozzles pass along the upper and lower surfaces of the torpedo body but do not impinge against the wings 80 which project from the sides of the torpedo, as previously described. The rudder operating mechanism, cable feeding mechanism and control mechanism is the same in the torpedo of FIGS. 7 and 8 as that previously described in connection with FIGS. 1, 2 and 3.

In FIG. 9 a torpedo 81 is shown on the ground ready to be launched by means of its rocket (of any of the types described above) the torpedo being rested on any convenient support 82 at an angle of elevation which may vary within rather large limits. The support 82 may be of wood or a metallic triangle or even a stone or pile of earth. The cable projecting from the rear of the torpedo should be firmly fixed to the ground near the torpedo, from which point it goes to the control unit wherever that may be. A typical trajectory is indicated by the line 83, representing the path of flight of the torpedo to its target 84.

The very early part of the trajectory can slant upward in order to give the torpedo a certain altitude above the ground, and velocity, while its propellent charge is burning. Farther away from its starting point and up to the time of impact, the depth rudder should be manipulated in such a way as to secure to the torpedo for a substantial part of its trajectory a gliding, horizontal or almost horizontal course at a low altitude above the ground. This low gliding trajectory will enable the operator to keep the torpedo's outline projected on the target aimed at, at least during the final portion of the trajectory, thus making use of the principle of "direct sight." The line of direct sight should preferably pass through the upper part of the target, or somewhat above it, i.e., above the spot on the target which is to be hit. It is desirable to keep the trajectory generally above the level of the target, at a sufficient distance from the ground to ensure good visibility of the torpedo and of the target and to eliminate the danger of the torpedo crashing to the ground short of its target. The operator will observe either with the naked eye or by means of a stereoscopic device or periscope the moment of the torpedo's approach to the target and at the moment will bring the torpedo down to the line of direct sight in order to ensure a direct hit on the target. The operator will, of course, operate the directional rudder at all times in such a way as to maintain the torpedo in the vertical plane passing through himself and the target, whether the latter is stationary or in motion.

Figure 10:
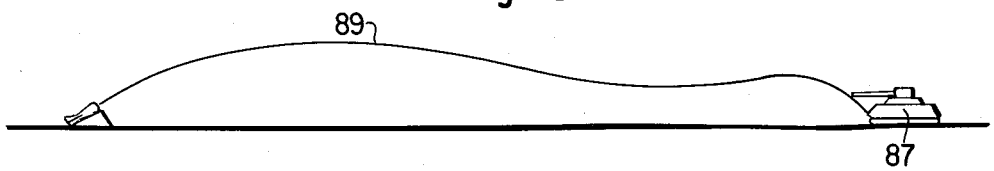
FIGS. 10 and 11 represent diagrammatically the vertical and horizontal profiles, respectively, of a trajectory resulting from guidance of the torpedo by two operators.
Figure 11:
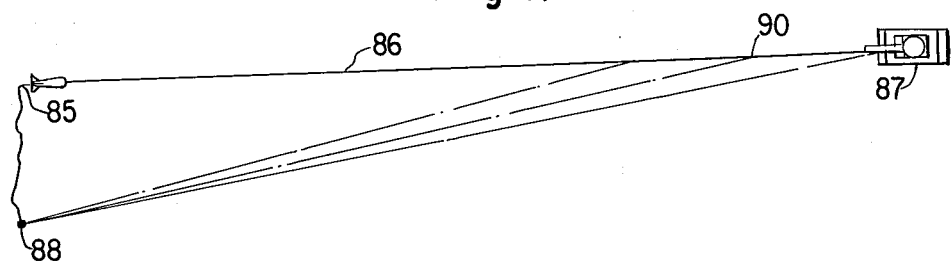

In order to obtain even higher precision of aiming, the control of the torpedo may be carried out by two operators placed at two different points sufficiently far apart and located preferably on a line perpendicular to the direction of fire. One of the operators should be located near the point of launching of the torpedo, indicated at 85 in FIG. 11, this operator being charged with the control of the directional rudder by means of one potentiometer of the type shown in FIG. 3. This operator will aim to maintain the torpedo continuously in the vertical plane 86 passing through himself and the target 87 whether the latter is stationary or in motion. The second operator is placed at a point 88 and operates the second potentiometer, controlling the torpedo's depth rudder, the potentiometers being, in this instance, housed separately but connected through the wires 45 and 47. The second operator will observe the flight of the torpedo and will operate its depth rudder so as to conform its flight substantially to the trajectory 89 in FIG. 10. In this instance it will be possible to keep the torpedo on the horizontal portion of this trajectory at a sufficient altitude, which may be higher than the top of the target, until nearly the end of its flight. Having the benefit of such lateral observation, the second operator can estimate with great accuracy the approach of the torpedo to its target and can actuate the depth rudder, for instance, at the point indicated by 90, in order to make the torpedo dive onto its target with increased velocity and greater destructive power. Alternatively, the second operator may bring the torpedo down to such a level that it will be on the direct sight line from the point 85 to the target during the latter portion of its flight, as in the case illustrated in FIG. 9.

Figure 12:
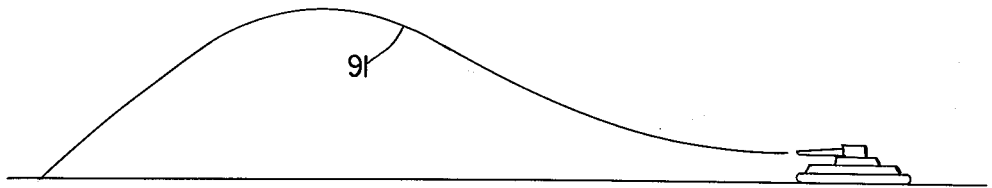
FIG. 12 represents diagrammatically a trajectory of a torpedo launched, for any reason, at a high angle.

FIG. 12 shows a special trajectory 91 of relatively high altitude for use in certain cases where there may be obstructions in the way of a lower trajectory or in order to keep the control cable out of contact with the ground, particularly in the vicinity of the target.

Ignition of the rocket charge can be effected initially in any suitable manned, as by means of a short fuse 12' or a simple sparking device communicating with the charge through either of the nozzles 12. The rocket charge should be of a character such that it will give the torpedo an initial velocity of approximately 80 to 100 meters per second during a first very short period of the torpedo's flight (e.g., not substantially more than one second, corresponding to a distance of 50 meters or so). In some instances, as in the case of the rear mounted rocket of FIG. 5, it may be practical to use a special rocket fuel of the type disclosed in applicant's co-pending application Serial No. 304,734, filed August 26, 1963, such fuel comprising essentially a combustible mixture adapted to give off a metallic vapor having high pressure and temperature.

The pre-charged air tank 15 may be put in communication with the servo-motors at the moment of launching by opening, in any convenient manner, a valve 28' in the tube 28, or the valve 28' may be of an inertia-actuated type needing only to be armed at the time of launching so that it will open automatically during the initial acceleration of the torpedo.

In cases where the rocket is detachable (FIGS. 1, 2, 5 and 6) it is provided particularly that this result follows merely from the combustion of selected charges at predetermined rates. In FIG. 1 the propellant charge 11 is expected to burn rapidly to give a powerful thrust of short duration.

Because of the location of the passage 8, the slow-burning powder therein will start to burn approximately at the moment of launching, but it must be capable of delaying the ignition of the charge in the chamber 7 until the charge 11 is almost spent. At that point the small charge in chamber 7 will blow the rocket off the nose of the torpedo by rupturing the plug 9, the residue of the charge 11 sufficing to carry the rocket out of way of the torpedo as it is guided to its target.

Ejection of the rocket 61 (FIGS. 5 and 6) is effected by the ignition of the small charge 65 when the propellant fuel 62 has been consumed.

It is intended that the total weight of the torpedo and rocket should be 15 to 25 kgs., the torpedo carrying an explosive charge of 7 to 10 kgs., which should be sufficient to destroy even a large tank by direct hit. From the aerodynamic point of view the torpedo should have a fineness ratio of 7 to 10, which can be easily obtained even taking into consideration the nozzles for gas discharge. The outer dimensions of the torpedo may be kept within very reasonable limits, the wing surfaces being no greater than 17 to 20 dm.$^2$ for a torpedo of 25 kg. A torpedo launched by means of a rocket at an initial velocity of 100 m./sec. and having a fineness ratio of 10 will still have a velocity of 90 m./sec. after having flown for a distance of 950 meters. The normal most effective range will probably be 400 to 700 meters, although accurate guidance could be extended, if necessary, as far as one kilometer.

What is claimed is:

1. A dirigible aerial torpedo comprising, an aerodynamically shaped body, wings extending from said body at a sufficient dihedral to ensure lateral stability and to provide for gliding flight, rocket means connected against relative movement to the front of said body and operable to give the torpedo a desired velocity, means for steering the torpedo vertically and horizontally in flight, remote control means for actuating the steering means, and a cable coiled and mounted at the rear of said body, said cable unwinding from said coil remote from said rocket means and connecting said control means with said steering means.

2. A dirigible aerial torpedo according to claim 1 in which the span of the wings is not substantially greater than the length of the body.

3. A dirigible aerial torpedo according to claim 1 in which the torpedo has a fineness ratio of 7 to 10.

4. A dirigible aerial torpedo comprising an aerodynamically shaped body, wings extending from said body to ensure lateral stability and to provide for gliding flight, rocket means connected against relative movement to the front of said body, said rocket means being operable to give the torpedo a desired velocity to put it in gliding flight, means for steering the torpedo, remote control means for activating said steering means, a cable coiled and mounted on the rear of said body, said cable unwinding from said coil remote from said rocket means and connecting said remote control means with said steering means, and timed explosive means between the body and rocket means to detach the latter from said body.

5. A dirigible aerial torpedo comprising an aerodynamically shaped body, wings extending from said body to ensure lateral stability and provide for gliding flight, rocket means connected against relative movement to the front of said body and operable to launch said body into flight, rudders on said body for controlling the flight thereof horizontally and vertically, servo-motor means operatively connected to said rudders, control means for causing a servo-motor to place a rudder in positions resulting in flight of the torpedo along a desired course horizontally, control means for causing a servo-motor to place a rudder in positions resulting in flight of the torpedo at desired altitudes, and a cable connecting said servo-motors with said control means, said cable being coiled and adapted to unwind from the rear of the body remote from the exhaust of the rocket during the flight of the torpedo.

6. A dirigible aerial torpedo according to claim 5 which includes a powder charge timed to burn while said body is attaining a desired velocity, and explosive means ignited by said powder charge for detaching the rocket means from said body when the latter has reached a desired velocity.

7. A dirigible aerial torpedo according to claim 5 in which said control means comprise adjustable rheostats operable by a single control handle connected by a crank lever to one rheostat and by a universal joint to the other rheostat.

8. A dirigible aerial torpedo according to claim 5 in which the control means are spaced apart, the one controlling the horizontal course being adjacent the point of launching of the torpedo and the one controlling altitude being spaced from said point in a position to permit lateral observation of the trajectory of the torpedo.

References Cited by the Examiner
UNITED STATES PATENTS

| | | | |
|---|---|---|---|
| 1,880,579 | 10/1932 | Tiling | 102—49 |
| 2,451,917 | 10/1948 | Chilowsky | 244—14 |
| 2,886,010 | 5/1959 | Hayos et al. | 91—51 |
| 2,936,738 | 5/1960 | Orloff | 91—51 |
| 2,995,116 | 8/1961 | Dobbins | 91—51 |
| 3,043,197 | 7/1962 | Piper et al. | 244—14 X |
| 3,067,682 | 12/1962 | Feldmann et al. | 102—49 |
| 3,090,582 | 5/1963 | Senger | 244—14 |
| 3,124,072 | 3/1964 | Herrmann | 102—49 |
| 3,163,711 | 12/1964 | Schindler | 244—14 X |

FOREIGN PATENTS
1,019,184  11/1957  Germany.

BENJAMIN A. BORCHELT, *Primary Examiner.*

SAMUEL FEINBERG, *Examiner.*

V. R. PENDEGRASS, *Assistant Examiner.*